United States Patent
Metz et al.

[11] Patent Number: 6,045,390
[45] Date of Patent: Apr. 4, 2000

[54] JUNCTION BOX FOR SHIELDED CABLE

[75] Inventors: Albert Metz, Blumberg; Dieter Jaag, VS-Villingen; Hermann Stadler, Donaueschingen, all of Germany

[73] Assignee: BTR Blumberger Telefon- Und Relaisbau Albert Metz, Germany

[21] Appl. No.: 09/047,480

[22] Filed: Mar. 25, 1998

[30] Foreign Application Priority Data

Mar. 26, 1997 [DE] Germany .......................... 197 12 630

[51] Int. Cl.⁷ .................................................. H01R 4/24
[52] U.S. Cl. .......................... 439/405; 439/98; 439/610; 439/412
[58] Field of Search .................................. 439/96.1, 892, 439/676, 405, 610, 98

[56] References Cited

U.S. PATENT DOCUMENTS

| | | | |
|---|---|---|---|
| 5,091,826 | 2/1992 | Arnett et al. | 439/76.1 |
| 5,228,872 | 7/1993 | Liu | 439/607 |
| 5,295,869 | 3/1994 | Siemon et al. | 439/76.1 |
| 5,447,441 | 9/1995 | Mueller et al. | 439/76.1 |
| 5,476,388 | 12/1995 | Rutkowski | 439/76.1 |
| 5,624,274 | 4/1997 | Lin | 439/676 |
| 5,688,145 | 11/1997 | Liu | 439/610 |
| 5,695,361 | 12/1997 | Elisei | 439/76.1 |
| 5,885,111 | 3/1999 | Yu | 439/676 |
| 5,951,321 | 9/1999 | Jaag | 439/405 |

*Primary Examiner*—Neil Abrams
*Assistant Examiner*—Hae Moon Hyeon
*Attorney, Agent, or Firm*—Eugene E. Renz, Jr., PC

[57] ABSTRACT

A junction box for shielded cable, such as data transmission cable comprising, a housing having an upper part and lower metal part which, in the assembled state, are in electrically conductive contact with each other, a PCB (25) installed in the housing, at least one jack (28) located in the housing, connected to the PCB (25) and having connecting means for connecting the wires of at least one shielded cable in a conductive manner to the PCB (25), said characterized in that the PCB (25) and at least one jack (28) being located in the upper part (2) of the housing, and connecting means for the wires (52) of the cables (50) comprising a loading block (14), into which the wires (52) can be introduced and which can be inserted into the lower part (1), and insulation displacement contacts (24), which are mounted in the upper part (2) and are connected to the PCB (25), and which, when the lower part (1) is joined to the upper part (2), pass through the loading block (14) and contact the wires (52).

15 Claims, 10 Drawing Sheets

JUNCTION BOX FOR SHIELDED CABLE

BACKGROUND OF THE INVENTION

Junction boxes for shielded cables such as data transmission cables are not new per se. German Patent DE 4,234,451 and U.S. Pat. No. 5,447,441 show prior art junction boxes. These boxes generally comprise a housing made up of an upper part and a lower part. The housing holds a connecting terminal for the wires of at least one cable and at least one jack into which a terminal plug can be inserted. The jacks and the connecting terminals are connected to each other via a printed circuit board (PCB). The housing surrounds and thus shields the PCB, the jacks, and the connecting terminals. In these boxes, the shielding of the cable is brought into conductive contact with the metal housing and a continuous ground connection for the shielding function is established from the cable shielding via the lower and upper parts of the housing and the PCB to the jack. The exposed parts of the wires, the connecting terminal and the PCB are completely enclosed and shielded, so that no stray radiation or stray signals can escape from the junction box to the ambient environment and no interfering signals from the outside can enter the junction box and to be picked up.

SUMMARY OF THE INVENTION

With the foregoing in mind, it is an object of the present invention to provide an improved junction box characterized by novel features of construction and arrangement having compact dimensions for easy assembly and installation. To this end, in the junction box of the present invention, wires of the cable to be connected are introduced into a loading block which is then inserted into the lower part of the housing. The PCB with the jack is inserted into the upper part of the housing.

When the upper part is set down onto the lower part, insulation displacement contacts pass through the upper part of the loading block and establish contact with the wires arranged there. As a result, the box is extremely easy to install. The wires of the cable to be connected must simply be inserted into the loading block, which can be done outside the housing and thus without any space limitations. Next, the loading block is inserted into the lower part of the housing and latched in place there. Finally, the upper part is set down onto the lower part of the housing, and the two parts are screwed together. When the upper part is put in position, the insulation displacement contacts are guided through the loading block and establish contact with the wires, there being no need for any separate installation steps. When the upper and lower parts of the housing are screwed together, therefore, the wires of the cable are automatically connected to the PCB, and in addition, the ground connection is established between the lower part, the upper part, and the PCB. Preferably only a single screw is provided to connect the upper part to the lower part and to establish the connection with the wires of the cable. If desired, a latching connection can also be provided in addition to the screw.

To insert the loading block into the lower part of the housing, the loading block is preferably pushed sideways into the lower part, so that it can then lock itself into the lower part. The wires are inserted into holes in the loading block, which are parallel to the direction in which the loading block will be pushed into the lower part of the housing. As a result, the loading block can be made very flat. Accordingly, not much height is required for the installation of the lower part and thus of the complete housing. In addition, the structural dimensions are kept small by the fact that the only height required for establishing contact with the wires is the height of the loading block itself, since the insulation displacement contacts pass through the loading block and are held in it. No additional space is required for establishing this contact.

The small height of the junction box and its compact lateral dimensions make it possible for the junction box to be inserted into a conventional, empty box of the standard type.

BRIEF DESCRIPTION OF THE DRAWINGS

These and other objects of the present invention and various features and details of the operation and construction thereof are hereinafter more fully set forth with reference to the accompanying drawings, wherein.

DETAILED DESCRIPTION OF THE PREFERRED EMBODIMENTS

Figure 1:
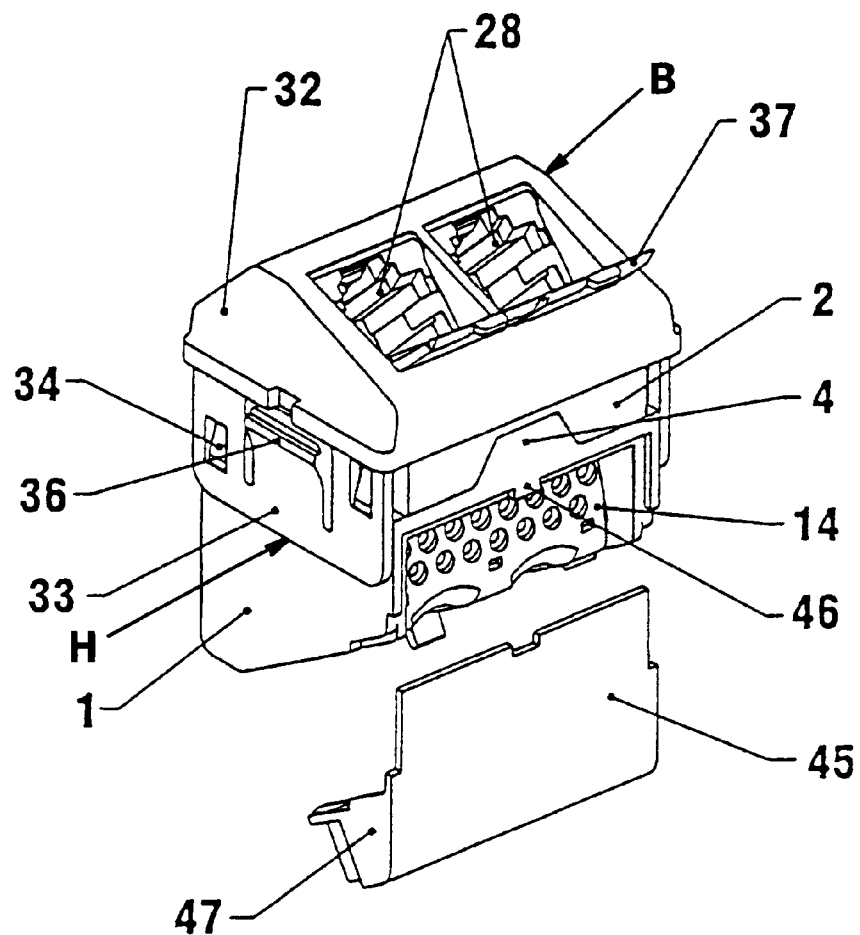
FIG. 1 is a perspective view of the junction box from above with the cable shield cover removed.
Figure 2:
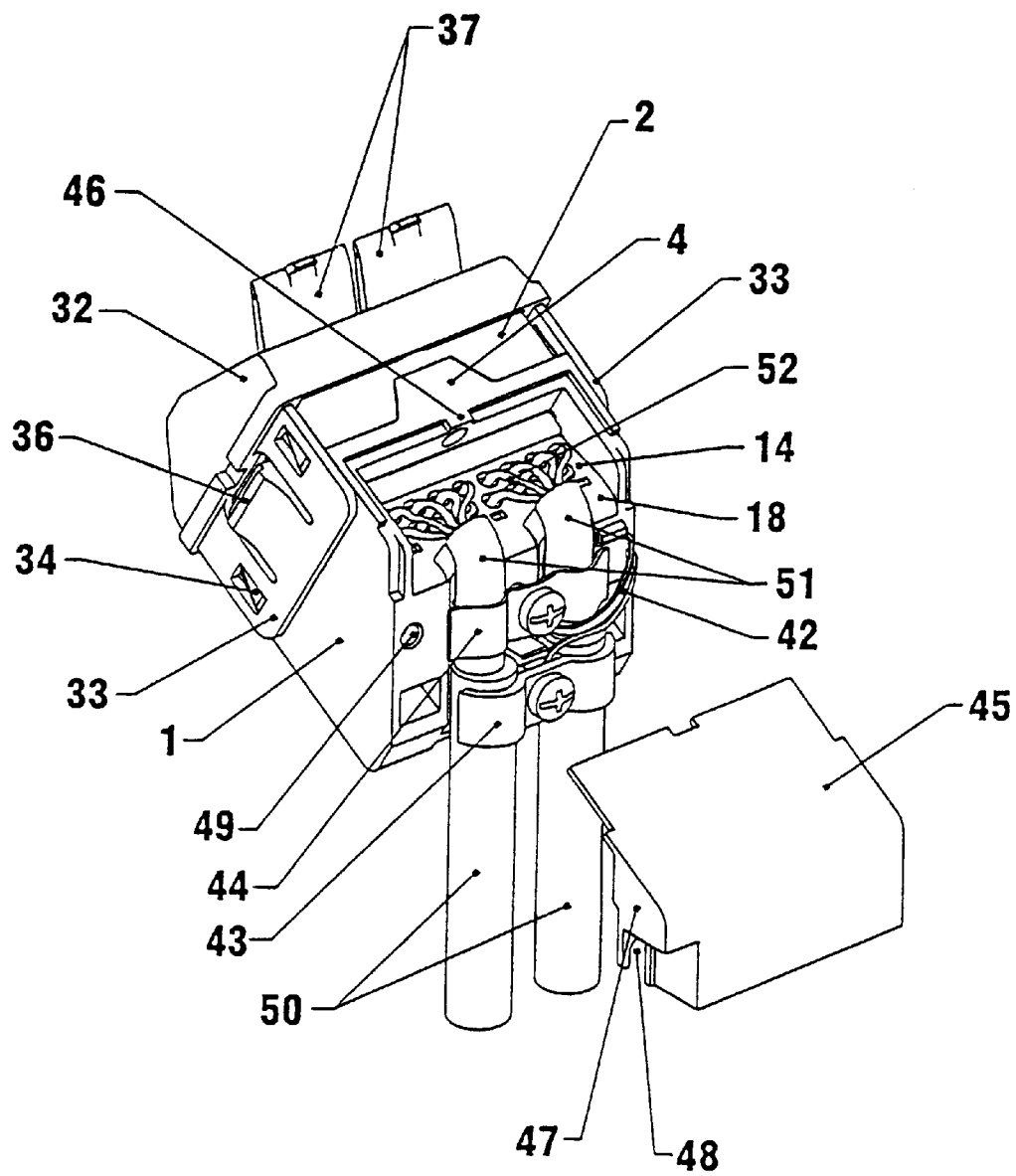
FIG. 2 is a perspective view of the junction box from below with the cable shield cover removed.
Figure 3:
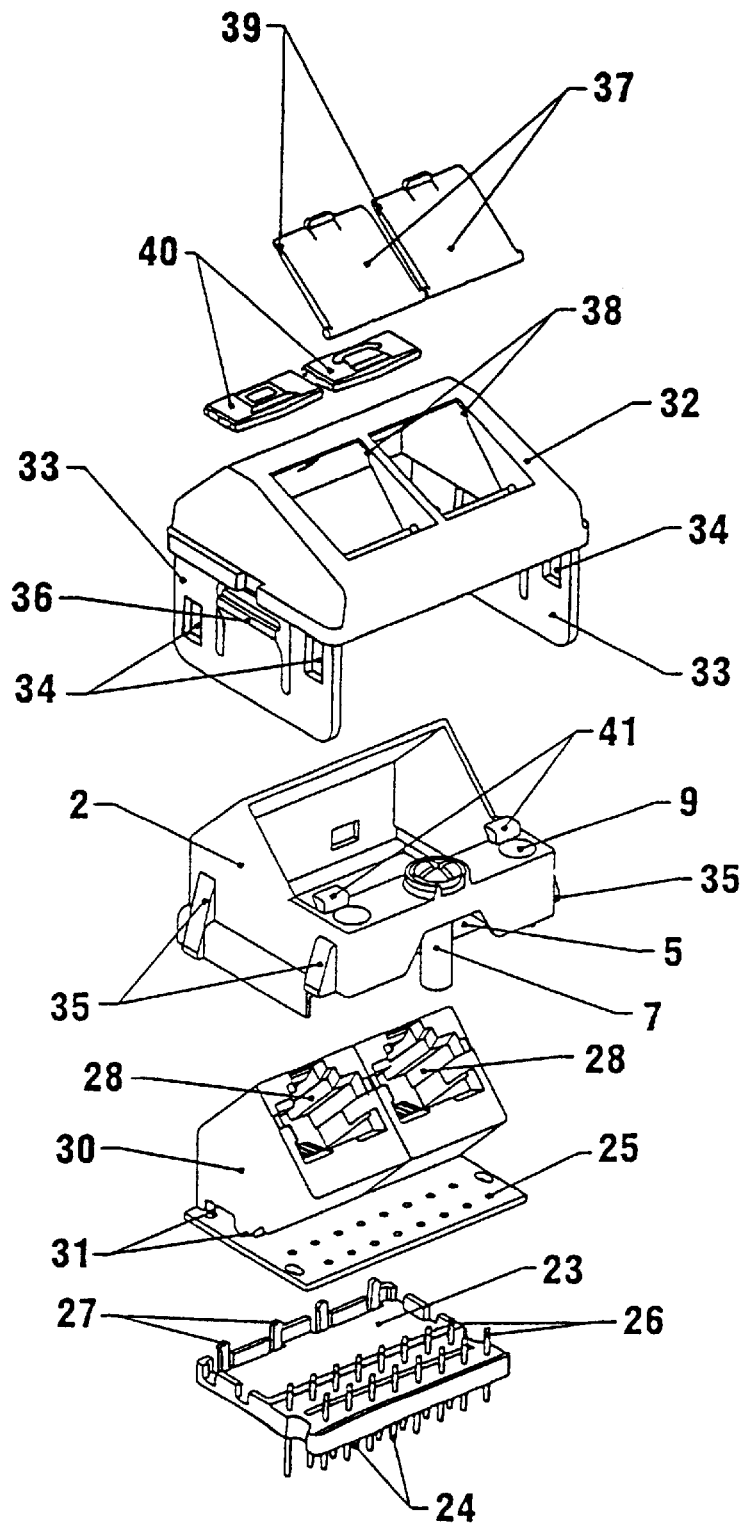
FIG. 3 is an exploded perspective view of the upper part of the junction box.
Figure 4:
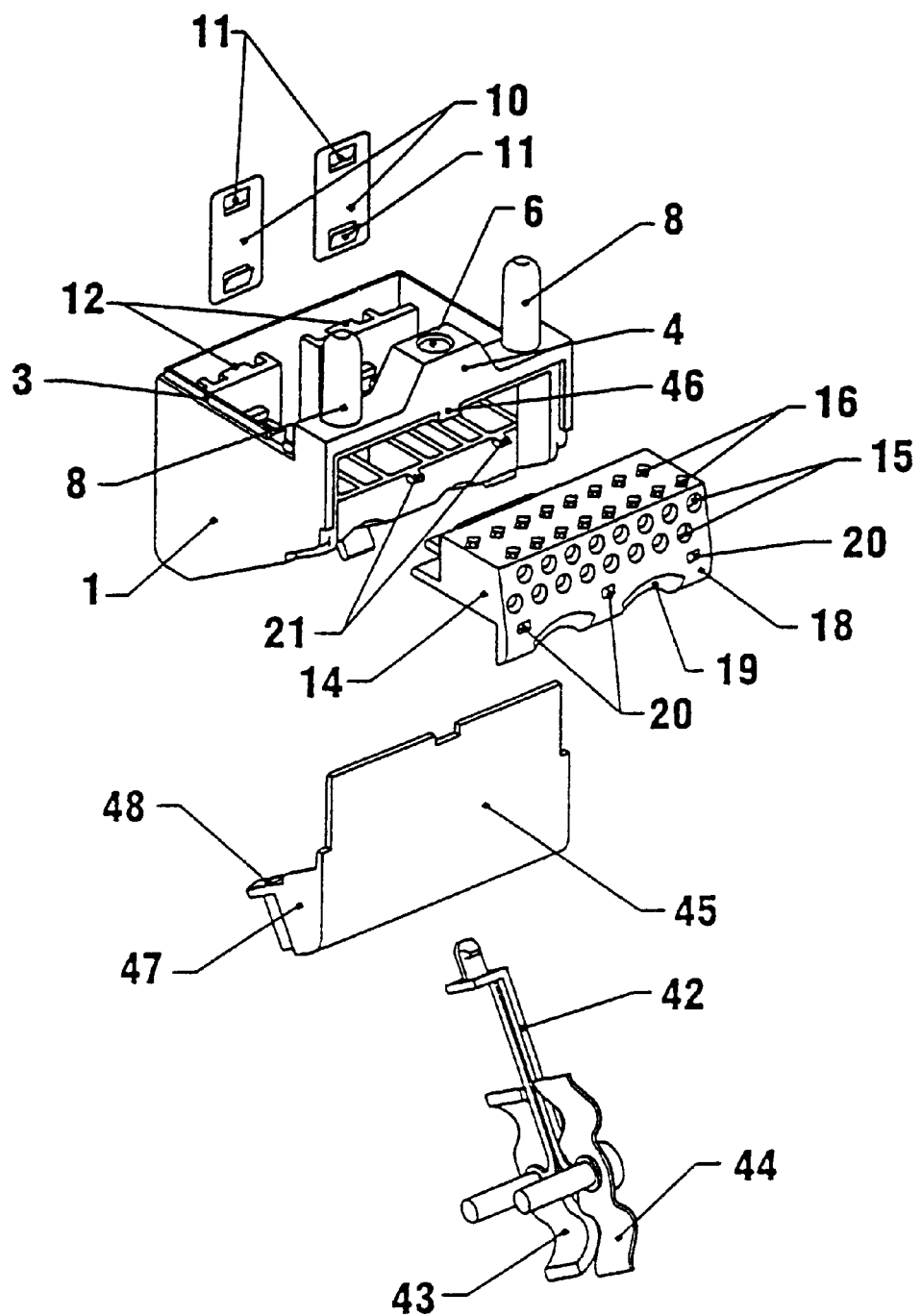
FIG. 4 is an exploded perspective view of the lower part of the junction box.
Figure 5:
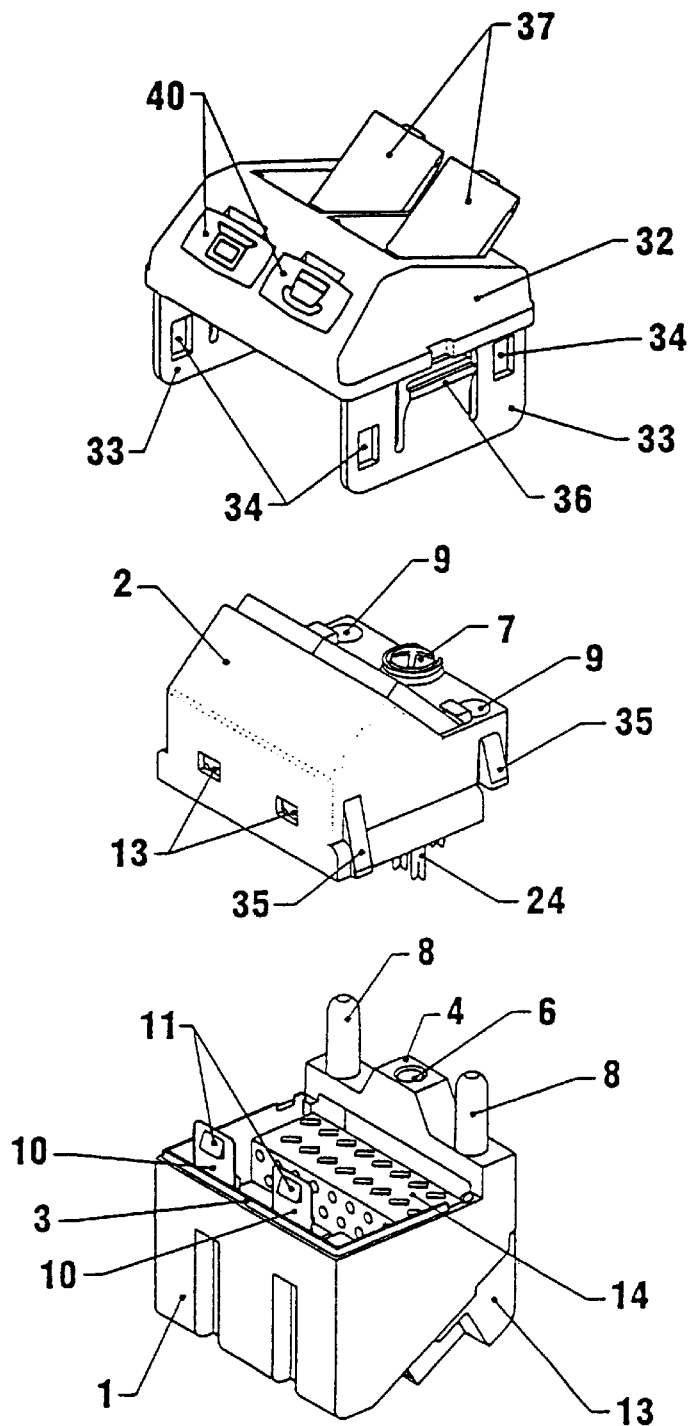
FIG. 5 shows the lower part and the upper part of the junction box, each in the assembled state but before they are joined together.
Figure 6:
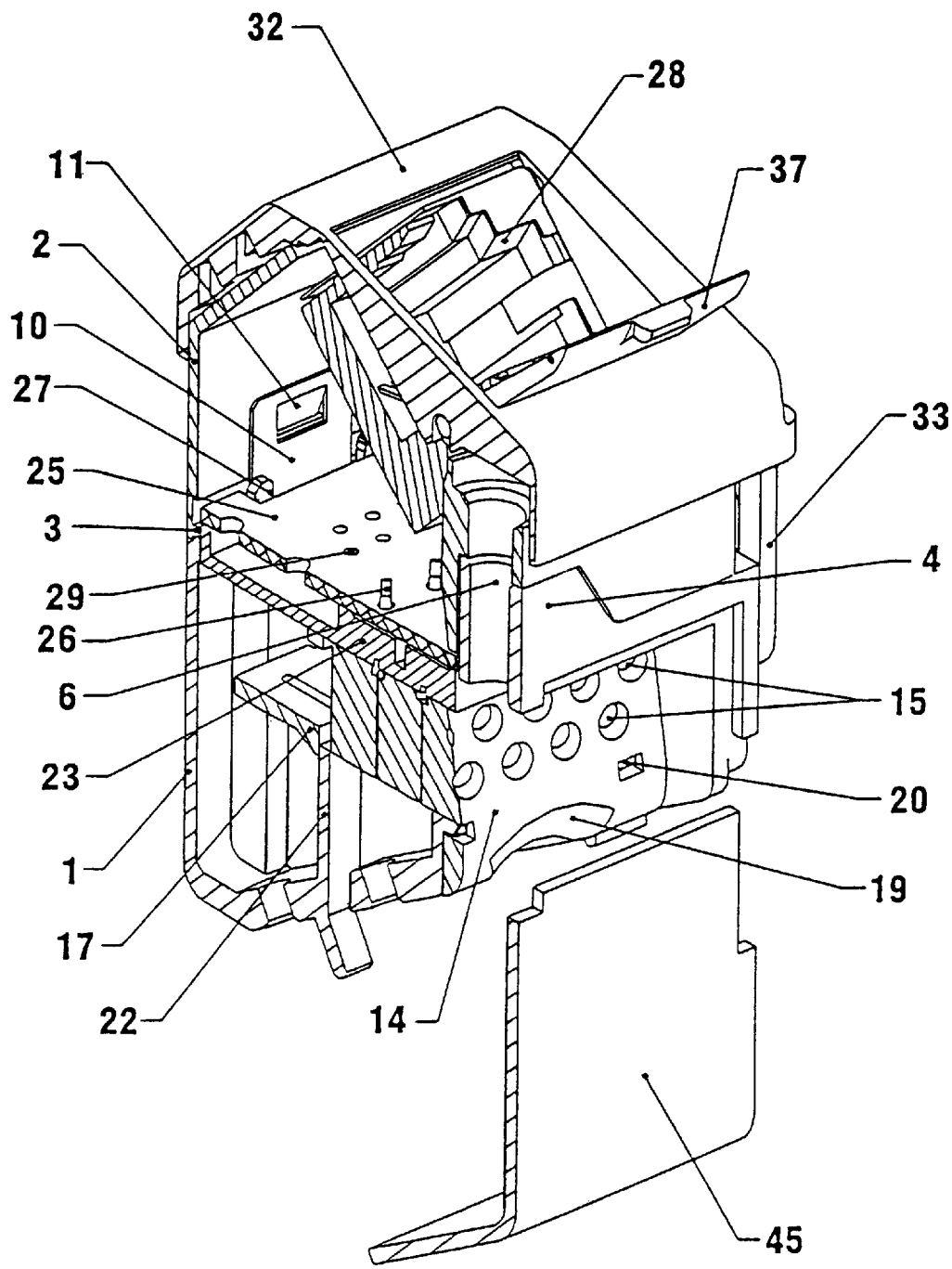
FIG. 6 is a perspective view partly in section of the completely assembled junction box in a vertical cross section with the jack cut away.
Figure 7:
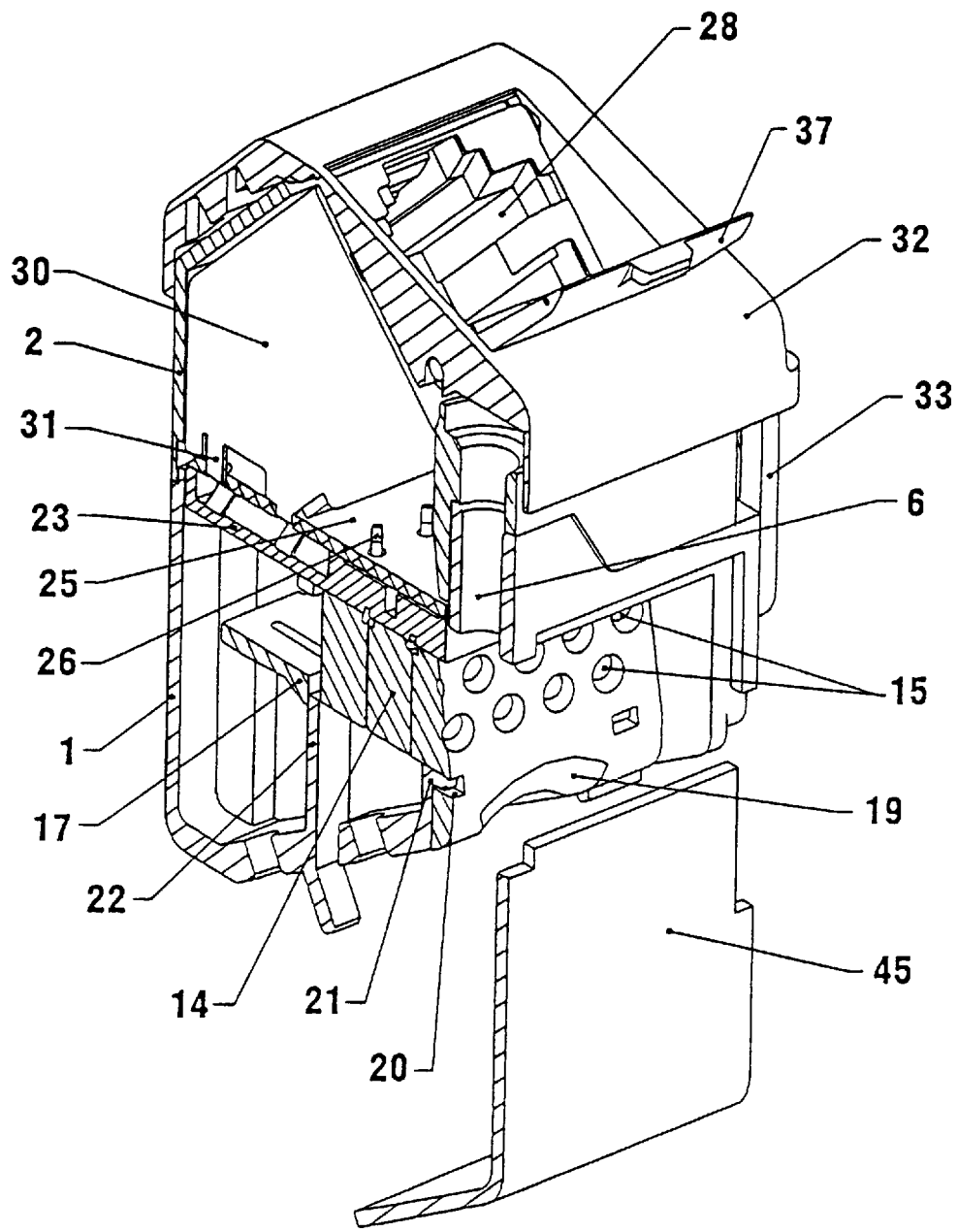
FIG. 7 is a view similar to FIG. 6 with a complete jack.

Referring now to the drawings, and particularly the embodiment of the invention illustrated in FIG. 1, the junction box which is generally designated by the letter B comprises a housing H, which is made up of a lower part 1 and an upper part 2. In the present instance, lower part 1 and upper part 2 are both one-piece, die-cast metal parts.

Lower part 1 of the housing is in the form of a box, the top of which is open and the bottom of which is slanted like a desk. The two narrow sides, the wide back, and the slanted, desk-like bottom of lower part 1 are closed. The smaller side at the front of lower part 1 is open and forms an insertion window for a loading block, to be described later.

Upper part 2 also has essentially the form of a box, the bottom of which is open. The sides of upper part 2 are closed. At the top of upper part 2, there is an arched roof, which is open toward the front, and which serves to accept jacks, to be described later.

When upper part 2 and lower part 1 are put together, the upper edges of lower part 1 and the lower edges of upper part 2 engage along their two narrow sides and the wide back to form a lock seam 3. The design of lock seam 3 prevents the formation of a continuous gap at the joint between lower part 1 and upper part 2, through which high-frequency electromagnetic radiation could pass.

The upper edge of the front of lower part 1 and correspondingly the lower edge of the front of upper part 2 coming into contact with it are made thicker. In the middle of the upper edge of the front of lower part 1, there is a projection 4 with sides which slant upward toward each other. When the housing is assembled, this projection engages a correspondingly shaped recess 5 in upper part 2. A threaded hole 6 is provided in projection 4, into which a screw 7 fits, this screw being seated in upper part 2. When the housing is put together, screw 7 is turned in threaded hole 6 to draw upper part 2 and lower part 1 together and thus to bring them into engagement. Two centering pins 8 are provided on top of the front edge of lower part 1, one on each side of projection 4. These pins fit into corresponding centering holes 9 in upper part 2 so that upper part 2 and lower part 1 are guided precisely in the axial direction during the assembly process.

On the back, two metal latching springs 10 are also provided to ensure a reliable connection between lower part 1 and upper part 2. Latching springs 10 are leaf springs, each of which has bent-out catches 11 at the upper and lower ends. On the inside surface of the back of lower part 1, two holding pockets 12 are provided; when latching springs 10 are inserted from above into these pockets, they are able to lock themselves in position by means of their lower catches 11. When upper part 2 is set down onto lower part 1, latching springs 10 serve as guides for upper part 2 in the area of back wall and ultimately lock themselves by their upper catches 11 in latching windows 13 in the back wall of upper part 2.

A loading block 14 can be pushed into the open front of lower part 1. Loading block 14 is made of plastic and is essentially in the form of a rectangular block. Receiving holes 15, which are arranged in two offset rows, one above the other, are provided in the front surface of loading block 14. These holes extend into loading block 14 in the direction perpendicular to the front surface. Contact channels 16 are provided in the top of loading block 14. These channels extend into loading block 14 in the direction perpendicular to the top surface. Contact channels 16 are arranged in two offset rows in such a way that each contact channel 16 intersects a receiving hole 15 in the interior of loading block 14 at a right angle. Contact channels 16 have the form of slots, rotated by an angle of 45° to the axis of receiving holes 15.

At the rear of loading block 14, a latching projection 17 is provided in middle of the bottom side. The latching projection 17 extends downward, horizontally toward the rear from the bottom surface of the loading block. At the bottom of the front of loading block 14, a collar 18 is formed, which projects downward over the lower surface of loading block 14. Collar 18 has two receiving hollows 19 for the cables to be connected. Along the line where collar 18 connects to the block, the collar has three centering windows 20 a certain distance apart, which correspond to centering projections 21, which are molded on lower part 1 underneath the insertion window in lower part 1. When loading block 14 is pushed into lower part 1, centering projections 21 of lower part 1 fit into centering windows 20 of loading block 14, so that the block is positioned precisely in the lower part 1. Latching projection 17 engages behind an inner transverse wall 22 in lower part 1, so that loading block 14 is also positioned in the insertion direction and held in place there.

A mounting plate 23 is inserted into the open bottom of upper part 2; this plate seals off the open bottom of upper part 2. Insulation displacement contacts 24 are inserted into mounting plate 23, which is made of plastic, in an arrangement which corresponds to the arrangement of contact channels 16 in loading block 14. Insulation displacement contacts 24 are accordingly arranged in two offset rows and are rotated by an angle of 45°. When upper part 2 is placed onto lower part 1, insulation displacement contacts 24 pass through contact channels 16 of loading block 14. A PCB 25, which is essentially equal in area to mounting plate 23, is seated on mounting plate 23. Insulation displacement contacts 24 extend upward beyond the mounting plate in the form of soldering pins 26. Soldering pins 26 pass through PCB 25 and are soldered to its conductive pathways. Latching hooks 27 on the outer edge of mounting plate 23 engage in recesses in PCB 25 to position it and to hold in place on mounting plate 23.

One or more jacks 28 are mounted on PCB 25. In the exemplary embodiment illustrated here, two jacks 28 are provided. In the illustrated example, jacks 28 are designed as "Western" jacks, into which terminal plugs can be inserted. Jacks 28 are mounted on PCB 25 in such a way that the direction in which the plugs are inserted into them is at an angle of 45° to the plane of PCB 25. Jacks 28 are seated by their soldering pins in holes 29 of PCB 25. By soldering these pins to the conductive pathways of PCB 25, the jacks are connected to soldering pins 26 of insulation displacement contacts 24. Jacks 28 are enclosed by a shield cover 30, which also forms the ground contact of jacks 28. Shield cover 30 is seated by pins 31 in PCB 25 and is soldered by these pins 31 to the ground tracks of PCB 25.

Mounting plate 23 with PCB 25 and jacks 28 is inserted as a preassembled unit from below into upper part 2 and riveted to it. This riveted connection establishes the ground contact between PCB 25 and upper part 2. Jacks 28 are thus located in the upper region of upper part 2 with its arched, roof-like configuration, and their insertion openings are accessible through the open insertion side of upper part 2.

A plastic cover 32 is placed on upper part 2 of the housing. Cover 32 encloses the upper area of upper part 2 but leaves the open insertion side of jacks 28 free. On the two narrow sides, cover 32 has sidepieces 33, molded on as one piece, which rest laterally against upper part 2. Two latching windows 34 are provided in each sidepiece 33; by means of these latching windows, sidepieces 33 are able to snap onto catches 35, which are molded externally on the narrow sides of upper part 2. Cover 32 is pressed down from above onto upper part 2; latching windows 34 of sidepieces 33 are thus able to lock onto catches 35, so that cover 32 is held firmly on the upper part. In addition, outward-projecting latching springs 36 are molded on sidepieces 33, by means of which cover 32 and thus the entire junction box can be snapped into the frame of an empty box, e.g., a flush device box.

The openings in cover 32 leading to the insertion holes of jacks 28 can be sealed off by dust flaps 37, which are mounted in cover 32 in such a way that they can pivot around an axis and lock themselves into recesses 38 in the closed position by means of catches 39. In addition, labeling pieces 40 can also be locked into cover 32 to label the services assigned to the various jacks 28. In the exemplary embodiment illustrated here, one of jacks 28 is connected to a telephone network, whereas the other jack 28 is connected to a data network, each being characterized by its own appropriate symbol.

When the preassembled unit is inserted into upper part 2, jacks 28 are braced against projections 41 when they reach their end position.

By means of a plastic strap 42, a pull-relief clamp 43 and a shielding clamp 44 are attached to slanted, desk-like bottom of lower part 1 in such a way that they cannot be lost. Pull-relief clamp 43 and shielding clamp 44 are each designed as elastic metal strips, which are parallel to each other and which can be attached by screws to lower part 1. The bottom of lower part 1 and its open front are sealed off by a metal shield cover 45. The upper edge of shield cover 45 engages under a catch 46 on lower part 1; at the bottom, shield cover 45 is bent over at an angle, so that it fits under the bottom of lower part 1. In the bent area, shield cover 45 has overlapping edges 47, on which lugs 48 are provided, into which screws can be inserted; these screws can be screwed into threaded holes 49 in bottom surface of lower part 1 to attach shield cover 45.

The junction box shown with two jacks 28 is for the connection of two shielded cables 50. The cables are brought in from the rear along the slanted, desk-like bottom surface of lower part 1. Cables 50 are positioned and held in place on lower part 1 by pull-relief clamp 43. Pull-relief clamp 43 holds cables 50 firmly by their insulation against the bottom of lower part 1. Ahead of pull-relief clamp 43, the insulating outside sheath of cables 50 is removed, so that cable shielding 51 is exposed. Cable shielding 51 is pressed by shielding clamp 44 against the bottom surface of lower part 1 to establish good ground contact between cable shielding 51 and the metal of lower part 1. The forward end of cable shielding 51 lies in receiving hollows 19 of collar 18 of loading block 14. At the forward end of cables 50, cable shielding 51 is removed, so that wires 52 are exposed. Wires 52 are introduced into receiving holes 15 of loading block 14 and contacted by insulation displacement contacts 24, which pass through loading block 14.

To install the junction box, the first step is to expose cable shielding 51 and wires 52 at the ends of cables 50. The wires 52 are then introduced into receiving holes 15 of loading block 14 while loading block 14 is still outside the housing, which means that wires 52 can be inserted without encumbrance. Then loading block 14, with wires 52 inserted in it, is pushed into lower part 1 and latched in place. Now cables 50 are fixed in place on lower part 1 by means of pull-relief clamp 43, and cable shielding 51 is brought into contact with lower part 1 by means of shielding clamp 44. Then upper part 2 is set down onto lower part 1, and thus insulation displacement contacts 24 enter contact channels 16 and pass through loading block 14. Centering pins 8 and centering holes 9 make it easy to place upper part 2 precisely onto lower part 1 and thus to introduce insulation displacement contacts 24 into contact channels 16. Screw 7 is then tightened in threaded hole 6, as a result of which upper part 2 is drawn against lower part 1. Thus insulation displacement contacts 24 travel all the way through contact channels 16 until they make contact with wires 52. Because of the pitch of the threads of screw 7, it does not take much force for the insulation displacement contacts 24 to cut through the insulation of wires 52. As soon as lower part 1 and upper part 2 have been drawn firmly together by screw 7, lower part 1 and upper part 2 form a closed, metal housing, which surrounds and shields jacks 8, PCB 25, and insulation displacement contacts 24 in loading block 14. The free area of wires 52 between cable shielding 51 and loading block 14 is shielded by shield cover 45, which is set on top. The shielding is carried through with good electrical contact from cable shielding 51, via shielding clamp 44, lower part 1, upper part 2, and PCB 25 to the shielding of jacks 28. The completely assembled junction box is then inserted into an empty electrical box and locked in place by means of latching springs 36.

Figure 8:
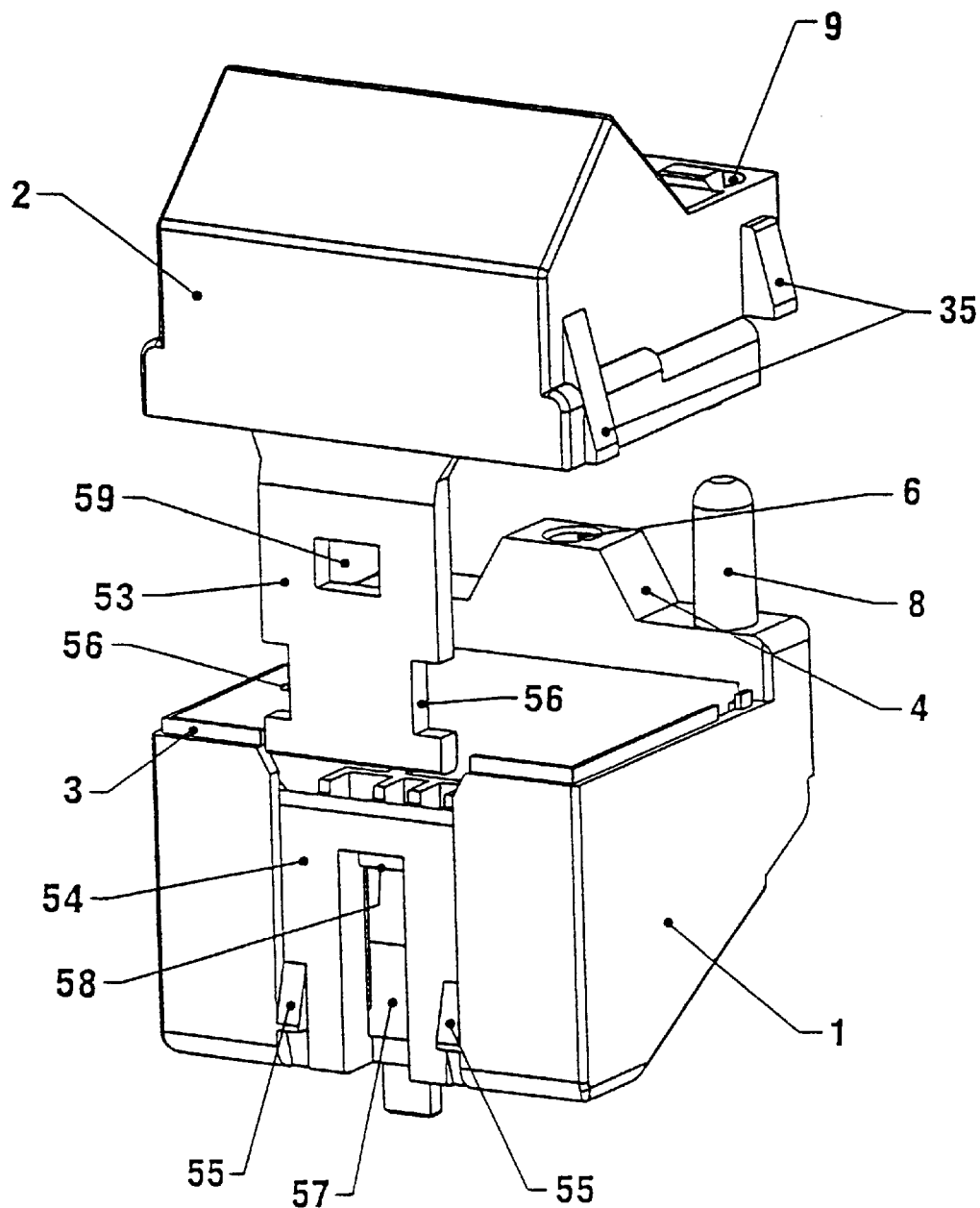
FIG. 8 is a perspective view of a modified design of the junction box before the parts are joined.
Figure 9:
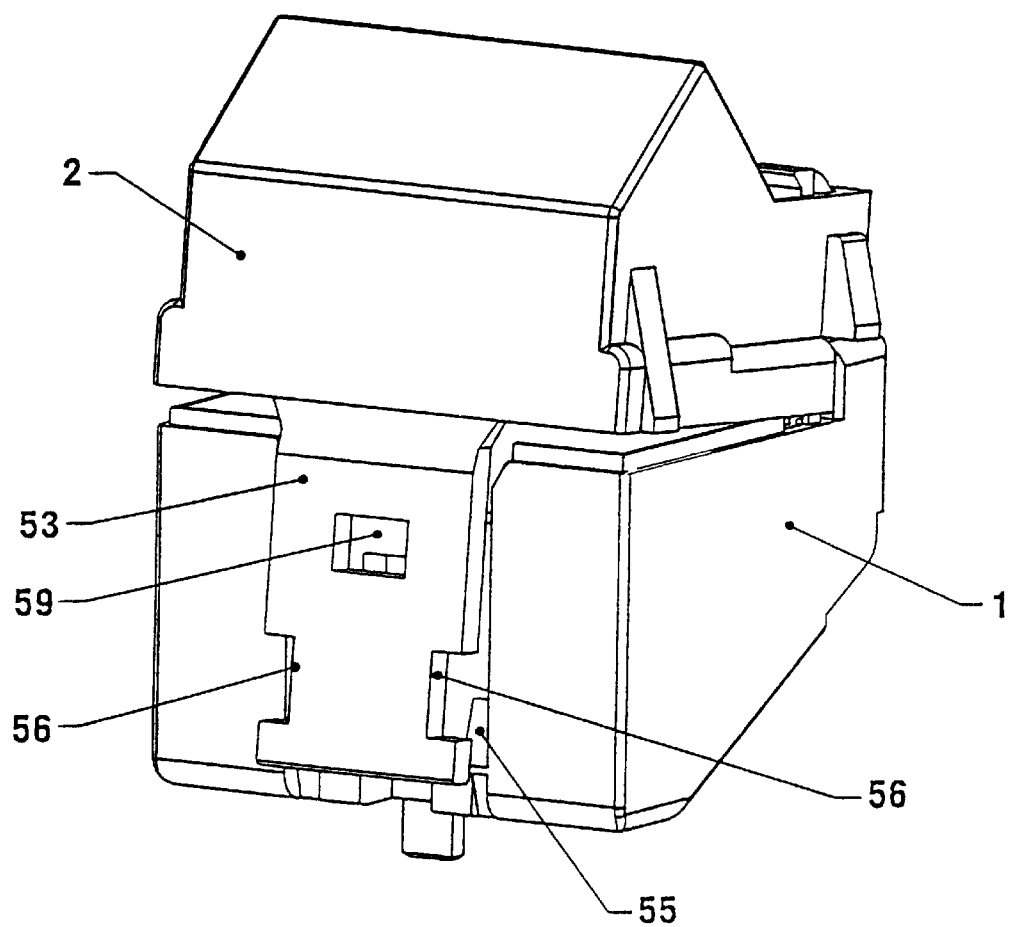
FIG. 9 shows the junction box according to FIG. 8 in the joined state before latching.
Figure 10:
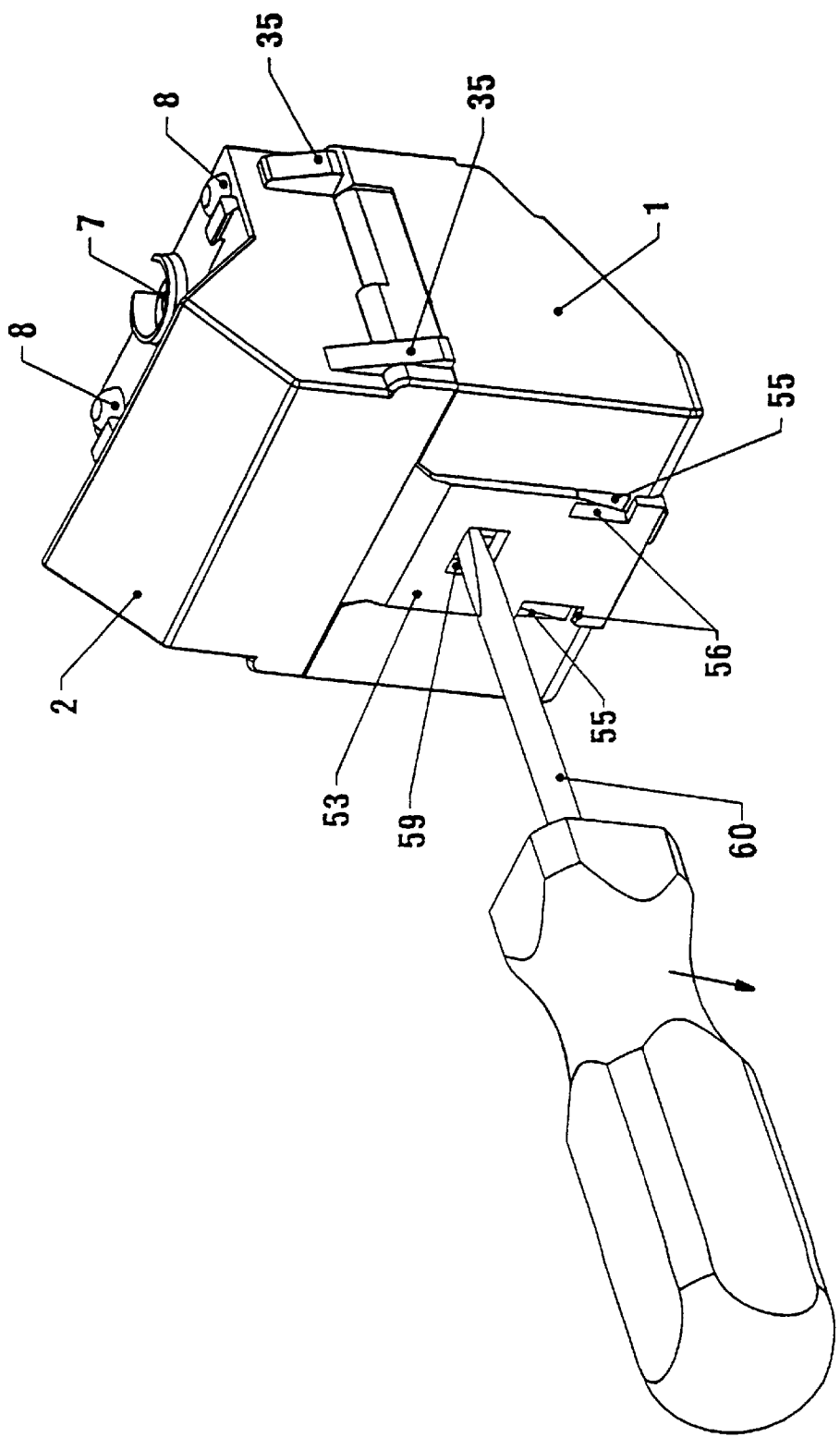
FIG. 10 shows how the junction box of FIG. 9 is latched.

FIGS. 8–10 show a modified design of the junction box. Only lower part 1 and upper part 2 are shown. Otherwise, this design is the same as the design described above according to FIGS. 1–7, and therefore reference can be made to that extent to the preceding description.

When lower part 1 and upper part 2 are drawn together by means of screw 7, insulation displacement contacts 24 pass through loading block 14 and cut through the insulation around wires 52. The insulation of wires 52 offers a certain mechanical resistance to this penetration. Because the screw is located asymmetrically outside loading block 14 and insulation displacement contacts 24, this resistance can cause a tipping moment to act on upper part 2, which can in turn interfere with the penetration of the insulation of wires 52 by insulation displacement contacts 24.

To counteract this interference, a downward-pointing strap 53 is molded on the back of upper part 2, opposite screw 7. Strap 53 engages in a guide opening 54 in the back of lower part 1. Catches 55 are provided at both edges of guide opening 54. Recesses 56 provided in the edges of strap 53 fit these catches 55. In the center of guide opening 54, a deep groove 57, extending longitudinally, is provided. At its upper end, this groove has a support edge 58. An opening 59, which is essentially aligned with support edge 58 of groove 57 after lower part 1 and upper part 2 have been brought together, is provided in the middle of strap 53. In the process of assembly, upper part 2 is set down onto lower part 1, starting from the position shown in FIG. 8. Upper part 2 is guided by centering pins 8, which engage in centering holes 9 and also by strap 53, which engages in guide opening 54. By means of screw 7, which engages in threaded hole 6, upper part 2 is drawn against lower part 1, and insulation displacement contacts 24 thus pass through contact channels 16 in loading block 14. The resistance offered to the cutting of the insulation around wires 52 by insulation displacement contacts 24 and the asymmetric arrangement of threaded hole 6 and screw 7 in relationship to loading block 14 have the result that, even after screw 7 has been completely screwed into threaded hole 6, upper part 2 is still not fully seated on lower part 1 at the back, opposite screw 7. This situation is shown in FIG. 9.

After screw 7 has been screwed completely down in threaded hole 6 and upper part 2 has assumed the position shown in FIG. 9 with respect to lower part 1, a screwdriver 60 is introduced through opening 59, so that the tip of screwdriver 60 fits into groove 57 and is supported against support edge 58. Screwdriver 60 can then be pivoted downward, as shown by the arrow in FIG. 10. Whereas the tip of screwdriver 60 is thus supported by support edge 58, the area of screwdriver 60 behind the tip is braced against the lower edge of opening 59. When screwdriver 60 is tilted down, therefore, strap 53 is pushed farther down until edge recesses 56 on strap 53 lock onto catches 55, as indicated in FIG. 10. The levering action of screwdriver 60 thus overcomes the resistance to the cutting of the insulation of wires 52 by insulation displacement contacts 24. Upper part 2 is seated firmly all the way around on lower part 1 as soon as the edge recesses 56 of strap 53 have locked onto catches 55.

To remove upper part 2 from lower part 1, screwdriver 60 is pushed from below into groove 57 between strap 53 and lower part 1, so that strap 53 can be lifted by the levering action of screwdriver 60 out of guide opening 54 and edge recesses 56 can be released from catches 55.

Even though a particular embodiment of the invention has been illustrated and described herein, it is not intended to limit the invention and changes and modifications may be made therein within the scope of the following claims.

What is claimed is:

1. A junction box for shielded cable, such as data transmission cable comprising:

a housing having an upper part and lower metal part which, in the assembled state, are in electrically conductive contact with each other;

a PCB (25) installed in the housing;

at least one jack (28) located in the housing, connected to the PCB (25) and having connecting means for connecting the wires of at least one shielded cable in a conductive manner to the PCB (25);

said characterized in that the PCB (25) and at least one jack (28) being located in the upper part (2) of the housing;

connecting means for the wires (52) of the cables (50) comprising a loading block (14), into which the wires (52) can be introduced and which can be inserted into the lower part (1), and insulation displacement contacts (24), which are mounted in the upper part (2) and are connected to the PCB (25), and which, when the lower part (1) is joined to the upper part (2), pass through the loading block (14) and contact the wires (52), wherein said loading block (14) has receiving holes (15) for the introduction of the wires (52) and contact channels (16) for the introduction of said insulation displacement contacts (24), said contact channels (16) extending through said loading block (14) in a direction perpendicular to the receiving holes (15), said receiving holes (15) and said contact channels (16) being offset among themselves in such a way that each contact channel (16) intersects a receiving hole (15) in the interior of the loading block (14); and wherein said loading block (14) can be latched into the lower part (1) in such a way that the contact channels (16) are perpendicular to the plane which separates the lower part (1) from the upper part (2).

2. Junction box according to claim 1, wherein said loading block (14) can be inserted laterally into the lower part (1), the receiving holes (15) being parallel to the direction in which the loading block (14) is inserted.

3. A junction box for shielded cable, such as data transmission cable comprising:

a housing having an upper part and lower metal part which, in the assembled state, are in electrically conductive contact with each other;

a PCB (25) installed in the housing;

at least one jack (28) located in the housing, connected to the PCB (25) and having connecting means for connecting the wires of at least one shielded cable in a conductive manner to the PCB (25);

said characterized in that the PCB (25) and at least one jack (28) being located in the upper part (2) of the housing; and connecting means for the wires (52) of the cables (50) comprising a loading block (14), into which the wires (52) can be introduced and which can be inserted into the lower part (1), and insulation displacement contacts (24), which are mounted in the upper part (2) and are connected to the PCB (25), and which, when the lower part (1) is joined to the upper part (2), pass through the loading block (14) and contact the wires (52), including a mounting plate (23) for supporting the PCB (25) in the upper part (2); and wherein the insulation displacement contacts (24) are seated in the mounting plate (23) and are connected to the PCB (25) by means of soldering pins (26).

4. Junction box according to claim 3, wherein the PCB (25) is latched to the mounting plate (23).

5. Junction box according to claim 3, wherein the mounting plate (23) and the one more jacks (28) are riveted as a preassembled unit into the upper part (2).

6. A junction box for shielded cable, such as data transmission cable comprising:

a housing having an upper part and lower metal part which, in the assembled state, are in electrically conductive contact with each other;

a PCB (25) installed in the housing;

at least one jack (28) located in the housing, connected to the PCB (25) and having connecting means for connecting the wires of at least one shielded cable in a conductive manner to the PCB (25);

said characterized in that the PCB (25) and at least one jack (28) being located in the upper part (2) of the housing; and connecting means for the wires (52) of the cables (50) comprising a loading block (14), into which the wires (52) can be introduced and which can be inserted into the lower part (1), and insulation displacement contacts (24), which are mounted in the upper part (2) and are connected to the PCB (25), and which, when the lower part (1) is joined to the upper part (2), pass through the loading block (14) and contact the wires (52), wherein the lower part (1) and the upper part (2) of the housing are connected to each other by a single screw connection (6, 7).

7. Junction box according to claim 6, wherein the lower part (1) and the upper part (2) can be latched together in the edge area located diametrically opposite the screw connection (6,7).

8. Junction box according to claim 7, wherein the lower part (1) and the upper part (2) can be latched together by means of a strap (53), the strap (53) being pulled into latching position by a tool (60), which is used to exert a levering action.

9. A junction box for shielded cable, such as data transmission cable comprising:

a housing having an upper part and lower metal part which, in the assembled state, are in electrically conductive contact with each other;

a PCB (25) installed in the housing;

at least one jack (28) located in the housing, connected to the PCB (25) and having connecting means for connecting the wires of at least one shielded cable in a conductive manner to the PCB (25);

said characterized in that the PCB (25) and at least one jack (28) being located in the upper part (2) of the housing; and connecting means for the wire (52) of the cables (50) comprising a loading block (14), into which the wires (52) can be introduced and which can be inserted into the lower part (1), and insulation displacement contacts (24), which are mounted in the upper part (2) and are connected to the PCB (25), and which, when the lower part (1) is joined to the upper part (2), pass through the loading block (14) and contact the wires (52), wherein the lower part (1) and upper part (2) are can be attached to each other under the guidance of centering means (8, 9).

10. Junction box according to claim 9, wherein the centering means are centering pins (8) and corresponding centering holes (9).

11. A junction box for shielded cable, such as data transmission cable comprising:

a housing having an upper part and lower metal part which, in the assembled state, are in electrically conductive contact with each other;

a PCB (25) installed in the housing;

at least one jack 28 located in the housing, connected to the PCB (25) and having connecting means for connecting the wires of at least one shielded cable in a conductive manner to the PCB (25);

said characterized in that the PCB (25) and at least one jack (28) being located in the upper part (2) of the housing; and connecting means for the wires (52) of the cables (50) comprising a loading block (14), into which the wires (52) can be introduced and which can be inserted into the lower part (1), and insulation displacement contacts (24), which are mounted in the upper part (2) and are connected to the PCB (25), and which, when the lower part (1) is joined to the upper part (2), pass through the loading block (14) and contact the wires (52), wherein the lower part (1) and the upper part (2) engage with each other by means of a lock seam (3) at the edges when they come in contact.

12. A junction box for shielded cable, such as data transmission cable comprising:

a housing having an upper part and lower metal part which, in the assembled state, are in electrically conductive contact with each other;

a PCB (25) installed in the housing;

at least one jack (28) located in the housing, connected to the PCB (25) and having connecting means for connecting the wires of at least one shielded cable in a conductive manner to the PCB (25);

said characterized in that the PCB (25) and at least one jack (28) being located in the upper part (2) of the housing;

connecting means for the wires (52) of the cables (50) comprising a loading block (14), into which the wires (52) can be introduced and which can be inserted into the lower part (1), and insulation displacement contacts (24), which are mounted in the upper part (2) and are connected to the PCB (25), and which, when the lower part (1) is joined to the upper part (2), pass through the loading block (14) and contact the wires (52), wherein at least one cable (50) to be connected is held in place on the lower surface of the bottom of the lower part (1), and said cable (50) or their wires (52) are guided around the edge of the lower part (1) to the loading block (14); and a collar (18) formed on the loading block (14), resting on the edge of the lower part (1) between the lower part (1) and the one or more cables (50) or their wires (52).

13. Junction box according to claim 12, wherein said cable (50) is held in place on the lower surface of the bottom of the lower part (1) by means of a pull-relief clamp (43).

14. Junction box according to claim 12, wherein the cable shielding (51) of at least one cable (50), which have been freed of their insulating material, is held by a shielding clamp (44) against the lower surface of the bottom of the lower part (1) in an electrically conductive manner.

15. Junction box according to one of claim 12, including a metallic shield cover (45) can be attached to the lower part (1) in electrically conductive contact, this shield cover sealing off at least the wires (52) of the cable (50) to be connected and the surface of the loading block (14) provided with the receiving holes (15).

* * * * *